United States Patent

[11] 3,609,096

| [72] | Inventor | Georges Henri Salomone<br>14 Avenue Pierre Ier de Serbie, Paris, 16eme, France |
|---|---|---|
| [21] | Appl. No. | 751,764 |
| [22] | Filed | Aug. 12, 1968 |
| [45] | Patented | Sept. 28, 1971 |
| [32] | Priority | Apr. 3, 1968 |
| [33] | | France |
| [31] | | 146,840 |

[54] COMPOSITION FOR EMULSIFYING HYDROCARBONS
3 Claims, No Drawings

[52] U.S. Cl. ..................................... 252/352,
252/136, 252/142, 252/363.5
[51] Int. Cl. ..................................... B01f 17/00,
C11d 3/04, C11d 7/08
[50] Field of Search ............................ 252/352,
136, 363.5

[56] References Cited
UNITED STATES PATENTS

| 1,998,819 | 4/1935 | Phair et al. ..................... | 252/136 X |
| 2,585,127 | 2/1952 | Holman et al. ................ | 252/136 |
| 3,249,547 | 5/1966 | Fisher ............................ | 252/136 |
| 3,296,149 | 1/1967 | Cook et al. .................... | 252/136 X |

*Primary Examiner*—Richard D. Lovering
*Attorney*—Young & Thompson

ABSTRACT: A composition for emulsifying hydrocarbons with fresh water or brackish water or sea water consists essentially of 30 to 70 percent by weight of strong mineral acid, 15 to 35 percent by weight of alkali metal salt or alkaline earth metal salt, and 15 to 35 percent by weight of a hydrophilic organic substance such as molasses or unrefined sugar or pancreatic peptone. It is especially useful for cleaning away petroleum products.

3,609,096

COMPOSITION FOR EMULSIFYING HYDROCARBONS

The mining of muds and deposits for crude oil and derivatives thereof poses some important and serious technological and economic problems. Only with difficulty can these muds and deposits be rendered fluent with steam, and this operation requires a considerable effort at high cost. The use of solvent and the mining of muds fluidized with steam create continuous water pollution which kills vegetation and animal life. Restoring the land and water thus polluted by such products also poses important technological problems.

It is an object of the present invention to provide a composition to emulsify crude oil and residuals of the same, with fresh water, brackish water or sea water.

The composition according to the invention is constituted by a mixture of a strong mineral acid, an alkali metal salt or alkaline earth metal salt, and a hydrophilic organic substance.

Preferably, the composition contains from 30 to 70 percent by weight of strong mineral acid, 15 to 35 percent by weight of alkali metal salt or alkaline earth metal salt, and 15 to 35 percent by weight of hydrophilic organic substance.

As the strong mineral acid, one or more known mineral acids may be used, such as phosphoric, hydrochloric, nitric, and hydrofluoric.

The alkali metal salt or alkaline earth metal salt is preferably a salt of the mineral acid used. However, alkali metal salts or alkaline earth metal salts may also be used, alone or in mixture, of strong mineral acids such as fluorides, difluorides, chlorides, sulfates, phosphates, nitrates, etc. of alkali metals such as sodium, potassium, lithium, etc. or alkaline earth metals such as calcium, strontium, barium, etc.

The organic hydrophilic substance may be a member selected from the class consisting of carbohydrates and hydrophilic polypeptides.

Preferably, when the product is for use in cleaning ferrous metal containers, the strong mineral acid used is phosphoric acid and the salt is an alkali metal phosphate or alkaline earth metal phosphate. Phosphoric acid has the advantageous effect of lightly phosphytizing the surfaces; and this, in the presence of mineral oils, protects the ferrous metal. The composition according to the invention, accordingly and preferably, consists essentially of 30 to 70 percent by weight of technically pure 75 percent phosphoric acid, 15 to 35 percent by weight of tribasic calcium phosphate, and 15 to 35 percent by weight of molasses.

For cleaning stone surfaces, beaches and the like, the acid preferably used is hydrofluoric acid.

The composition according to the invention, when mixed with agitation with hydrocarbons in an amount about 50 to 70 percent by weight of composition to 100 parts by weight of the residual products to be eliminated, yields a stable emulsion which may be mixed with water to any desired dilution.

The following illustrative examples of compositions according to the present invention are given, in which the numerals refer to parts by weight:

Example 1

| | |
|---|---|
| Hydrofluoric acid | 48 |
| Ammonium bifluoride | 9 |
| Ammonium sulfate | 9 |
| Barium chloride | 9 |
| Saccharose | 10 |
| Unrefined sugar | 15 |

Example 2

| | |
|---|---|
| Phosphoric acid | 52 |
| Dibasic calcium phosphate | 24 |
| Unrefined sugar | 24 |

Example 3

| | |
|---|---|
| Phosphoric acid | 50 |
| Dibasic calcium phosphate | 25 |
| Pancreatic peptone | 25 |

Example 4

| | |
|---|---|
| Hydrochloric acid | 40 |
| Sodium chloride | 15 |
| Tribasic calcium phosphate | 15 |
| Molasses | 30 |

Example 5

| | |
|---|---|
| Nitric acid | 30 |
| Sodium nitrate | 15 |
| Ammonium sulfate | 10 |
| Calcium chloride | 10 |
| Saccharose | 15 |
| Molasses | 20 |

The mixture according o Example 1 above has been used to clean rocks soiled by petroleum. The composition has been applied by brushing to coastal rocks. The resultant milky layer was removed by natural dilution at the next tide, the rocks having been cleaned of all the material that soiled them.

The composition according to Example 2 above was used in the form of an aqueous paste to emulsify 22 pounds of petroleum residue from Iraq. The 22 pounds of petroleum residue and 13.2 pounds of composition according to the invention were pumped in a double-acting positive displacement pump and the resulting compressed homogeneous paste was diluted with water.

To study the action of the invention on marine vegetation, there were established dilutions at three different concentrations very much higher than the concentrations encountered in practice, which, at the time of dumping is at most 5 percent and which immediately diminishes by mixture with the water which receives the dumped material, whether sewerage or river or sea water. These concentrations were respectively 10, 25 and 50 percent of the homogenous paste. Twelve different species of mushroom had been cultivated in these various media: Sterigmatocystis nigra, Aspergillus amstelodami, Aspergillus flavus, Penicillium brevi-compactum, Penicillium cyclopium, Paecilomyces varioti, Acrostalagmus koningi, Chaetomium globosum, Myrothecium verrucaria, Stachybotrys atra, Memnoniella echinata, Penicillium funiculosum. The mushrooms developed normally in concentrations of 10 to 25 percent. Growth was a bit retarded at a concentration of 50 percent.

The same composition was the subject of an experiment as to its action on diving birds. To this end, 2 quarts of crude oil were emulsified with 1 quart of composition according to the present invention and 25 quarts of water. Two duck were immersed in this solution. They did not seem to be in the least incommoded and swam normally. Their features were not stuck together and were not rendered wettable. Out of the water, the birds dried normally.

The composition according to Example 3 was used for cleaning a steel vessel containing about 110 pounds of No. 2 heavy fuel oil. The emulsification of this heavier material required 82 pounds of composition according to the invention. After vigorous agitation, 50 gallons of water were introduced by means of a hose into the vessel so as to effect a first dilution. The mixture was pumped out and severed with an additional 400 gallons of water so as to ensure a harmless concentration. The walls of the vessel were entirely clean.

The mixtures given above by way of example are susceptible of numerous modifications without departing from the scope of the present invention.

Having described my invention, I claim:

1. A composition for emulsifying hydrocarbons with water, consisting essentially of a mixture of 30 to 70 percent by weight of a strong acid selected from the class consisting of phosphoric, hydrochloric, nitric, and hydrofluoric, 15 to 35 percent by weight of a salt selected from the class consisting of fluoride, difluoride, chloride, sulfate, phosphate and nitrate of sodium, potassium, calcium, ammonium and barium and 15 to 35 percent by weight of a hydrophilic organic substance selected from the class consisting of unrefined sugar and pancreatic peptone.

2. A composition as claimed in claim 1, in which said strong acid is phosphoric acid, said salt is dibasic calcium phosphate, and said hydrophilic organic substances is molasses.

3. A composition as claimed in claim 2, in which said phosphoric acid is present in an amount about 52 parts by weight, said dibasic calcium phosphate is present in an amount about 24 parts by weight, and said molasses is present in an amount about 24 parts by weight.